United States Patent [19]
Francis et al.

[11] Patent Number: 6,113,500
[45] Date of Patent: *Sep. 5, 2000

[54] 3-D SIMULATOR RIDE

[75] Inventors: Mitchell J. Francis, Beverly Hills; Gary H. Packman, Sherman Oaks, both of Calif.

[73] Assignee: Cinema Ride, Inc., Studio City, Calif.

[ * ] Notice: This patent is subject to a terminal disclaimer.

[21] Appl. No.: 09/271,371

[22] Filed: Mar. 18, 1999

[51] Int. Cl.$^7$ .................................................. A63G 31/04
[52] U.S. Cl. ............................................. 472/60; 472/130
[58] Field of Search ................... 472/60, 61, 59, 472/130; 434/29, 55

[56] References Cited

U.S. PATENT DOCUMENTS

| | | | |
|---|---|---|---|
| 4,066,256 | 1/1978 | Trumbull | 272/18 |
| 4,855,842 | 8/1989 | Hayes et al. | 358/342 |
| 4,885,878 | 12/1989 | Wuu | 52/6 |
| 4,907,860 | 3/1990 | Noble | 350/334 |
| 4,962,420 | 10/1990 | Judenich | 358/60 |
| 5,026,152 | 6/1991 | Sharkey | 352/85 |
| 5,433,670 | 7/1995 | Tumbull | 472/60 |
| 5,572,749 | 11/1996 | Ogden | 2/421 |
| 5,662,523 | 9/1997 | Yasumaru et al. | 463/30 |
| 5,695,406 | 12/1997 | Park | 472/61 |
| 5,857,917 | 1/1999 | Francis et al. | 472/60 |

*Primary Examiner*—Kien T. Nguyen
*Attorney, Agent, or Firm*—Aquilino, Welsh & Flaxman

[57] ABSTRACT

A 3-D simulator amusement ride is disclosed. The ride includes a motion base formed in a hexagonal pattern with up to six degrees of freedom of movement, a passenger enclosure supported upon the motion base, a 3-D video image system attached to the enclosure and a computerized control system which functions to synchronize the movement of the enclosure to a viewed 3-D video.

4 Claims, 8 Drawing Sheets

3-D SIMULATOR RIDE

BACKGROUND OF THE INVENTION

1. Field of the Invention

The present invention relates to an amusement ride which simulates the motion of three-dimensionally projected video images.

2. Description of the Prior Art

There are various prior art patents which relate to amusement ride simulators, some as old as the U.S. Pat. No. 892,070 patent to Murphy which issued in 1908. Others, including the likes of U.S. Pat. No. 1,844,852 to Harvey; U.S. Pat. No. 1,789,680 to Gwinnett; U.S. Pat. No. 2,861,806 to Disney; U.S. Pat. No. 4,066,256 to Trumbull; U.S. Pat. No. 4,251,140 to Fogerty, Jr.; U.S. Pat. No. 4,874,162 to Trumbull et al.; U.S. Pat. No. 4,879,849 to Hollingsworth, III et al.; U.S. Pat. No. 4,885,878 to Wuu and U.S. Pat. No. 5,071,352 to Denne, having been developed over the years. None of the prior patents set forth an amusement ride which projects 3-D videos in combination with a motion base having up to six degrees of freedom of movement, although 3-D technology is known, such as taught by U.S. Pat. No. 4,907,860 to Nobel. Most simulator amusement rides are known to use frames of optically recorded images on film and not fields of electronically encoded video data on a disc. Film formats are not suitable for numerous repeat 3-D projections because the picture quality degenerates and they require rewinding or film looping.

Also, the prior art has not recognized the need to design amusement rides of this type in a way to be able to physically fit into existing buildings located in premier tourist-traffic locations.

SUMMARY OF THE INVENTION

The present invention is directed to an amusement ride including a motion base with a plurality of actuators and a video imaging system. In a preferred embodiment, the apparatus includes a motion base with a plurality of degrees of freedom of motion including a plurality of actuators supporting a platform, a passenger holding structure secured to the platform, and a digital storage medium storing 3-D video information. The apparatus further includes a 3-D personal head mounted video unit, wherein the 3-D personal head mounted video unit projects a 3-D image based upon 3-D video information stored on the digital storage medium. A motion control system is also included. The motion control system includes a computer which receives digital signals encoded on the digital storage medium for moving the platform in correspondence with the 3-D video information and the 3-D image.

A true flight simulator uses an enclosed capsule, which moves the entire enclosure including the screen, projectors and seats. This is considered the truest simulation of motion because all of the user's senses are completely controlled within the enclosed space. There is no outside peripheral vision of nonmoving elements to distract the user and lessen the simulated experience.

The image system used in the present invention is preferably digital and employs a head mounted video unit. The system also includes a laser video disc player, a sync generator and a show control computer to project a three-dimensional picture when viewed through the head mounted video unit. In accordance with alternate embodiments, dual projectors and laser disc players synchronized with one another may be employed without departing from the spirit of the present invention.

The show control computer receives time coded signals from the lasers reading the disc and then synchronizes the movement of the base to correspond with the image being viewed. The show control computer may also control various other aspects such as sound, wind machines, seat vibrators, lights and automatic doors on the passenger enclosure.

It is an object of the present invention to provide an amusement ride with a motion base which incorporates the use of 3-D video technology to produce a simulated experience, without film degeneration and without the need for rewind time.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
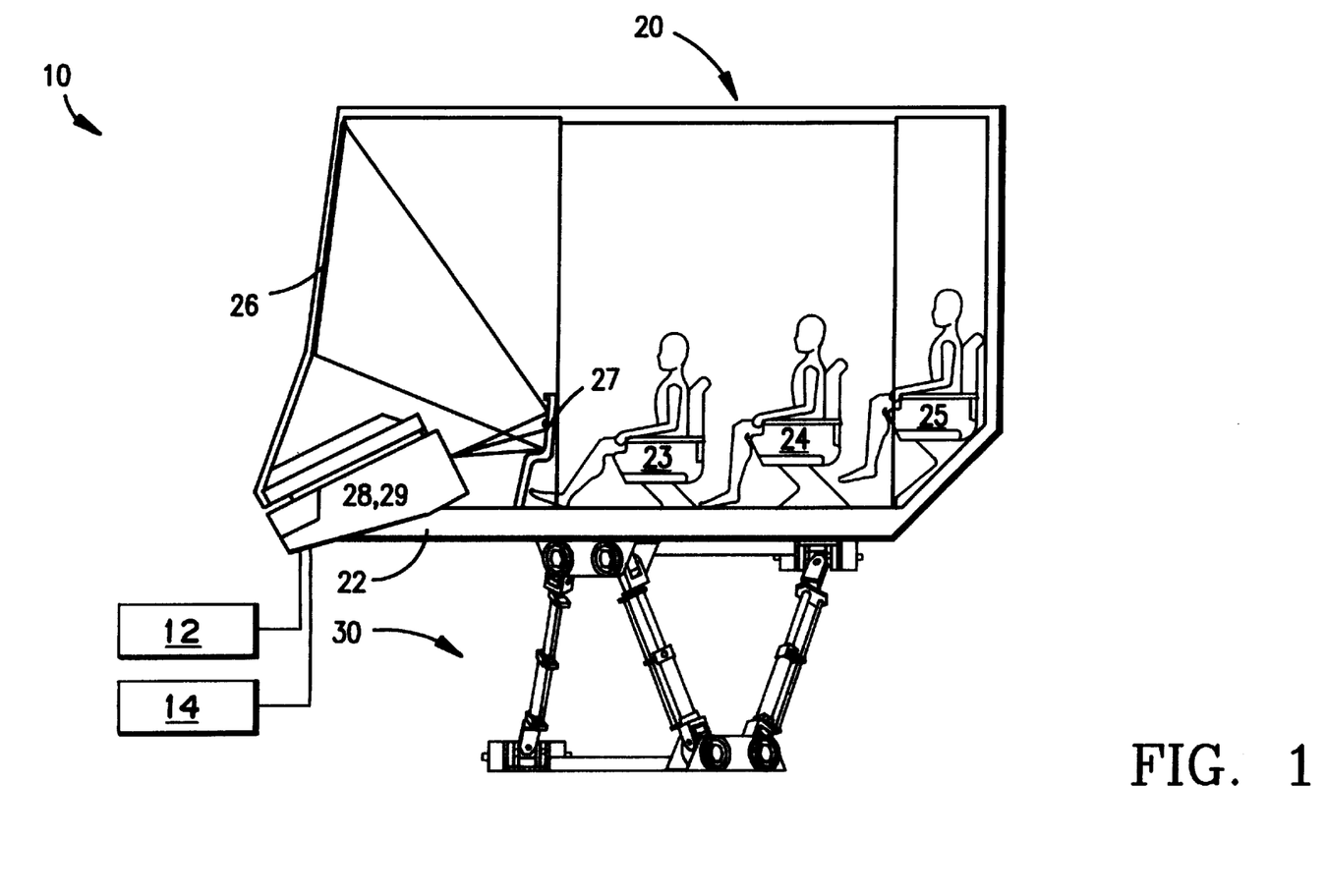
FIG. 1 shows a side view of a preferred embodiment with the side wall of the capsule cut-away.

Turning to FIG. 1, a first capsule embodiment 10 of the invention is shown. In this design, a capsule 20 with a bottom platform 22 is mounted upon a motion base 30. The capsule 20 is dimensioned to seat fifteen riders and includes three rows of seats 23, 24 25 generally with five seats in each row. The seating area is generally 10 feet wide, 14 feet long and 8 feet high. Enclosed within, and attached to, the capsule 20 is a big screen 26, a reflector 27 and a pair of projectors 28 and 29. Laser video disc players 12, 14 are stored in an adjacent rack with the show control computer, the sound system and other electronic control components which are discussed in greater detail below. The term laser video disc player is used throughout the present specification to describe digital video processors commonly employed in video and audio processing, and a wide variety of available processors may be employed without departing from the spirit of the present invention.

Figure 6:
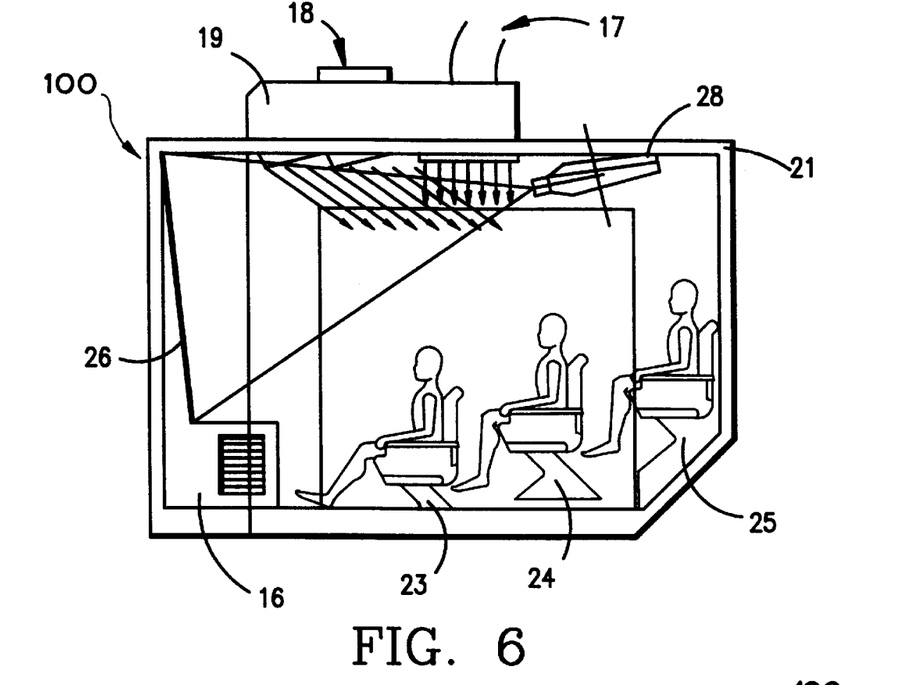
FIG. 6 shows a side view of a second embodiment of the capsule with the side wall cut away.
Figure 7:
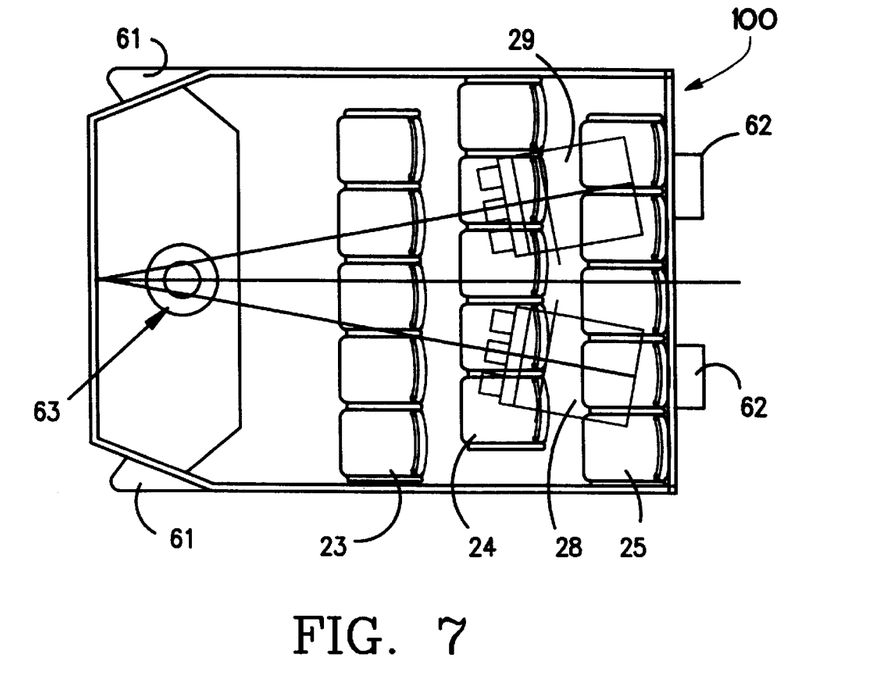
FIG. 7 shows a top view of the capsule in FIG. 6 with the top wall cut away.

FIGS. 6 and 7 show a second preferred capsule embodiment 100 which again includes three rows of seats 23, 24 25 and a big screen 26. In this embodiment, the laser disc players are mounted within a storage cabinet (not shown) and projectors 28 and 29 are mounted to the top wall 21 of the capsule. Mounted on top of capsule 100 is a duct system 19 and a fan 18 which cooperates with the duct system to simulate wind within the cabin. Specifically, the wind machines are typically in the front of the capsule, near the screen, and blow out toward the audience. Also cooperating with duct 19 is a separate and distinct air conditioner duct 17 for pumping fresh air into the capsule. A water spray system may also be incorporated with the present invention.

The speaker layout 60 is best seen in FIG. 7. The speaker layout 60 includes front side speakers 61, rear and side surround speakers 62 and a center channel sub-woofer 63.

Figure 2:
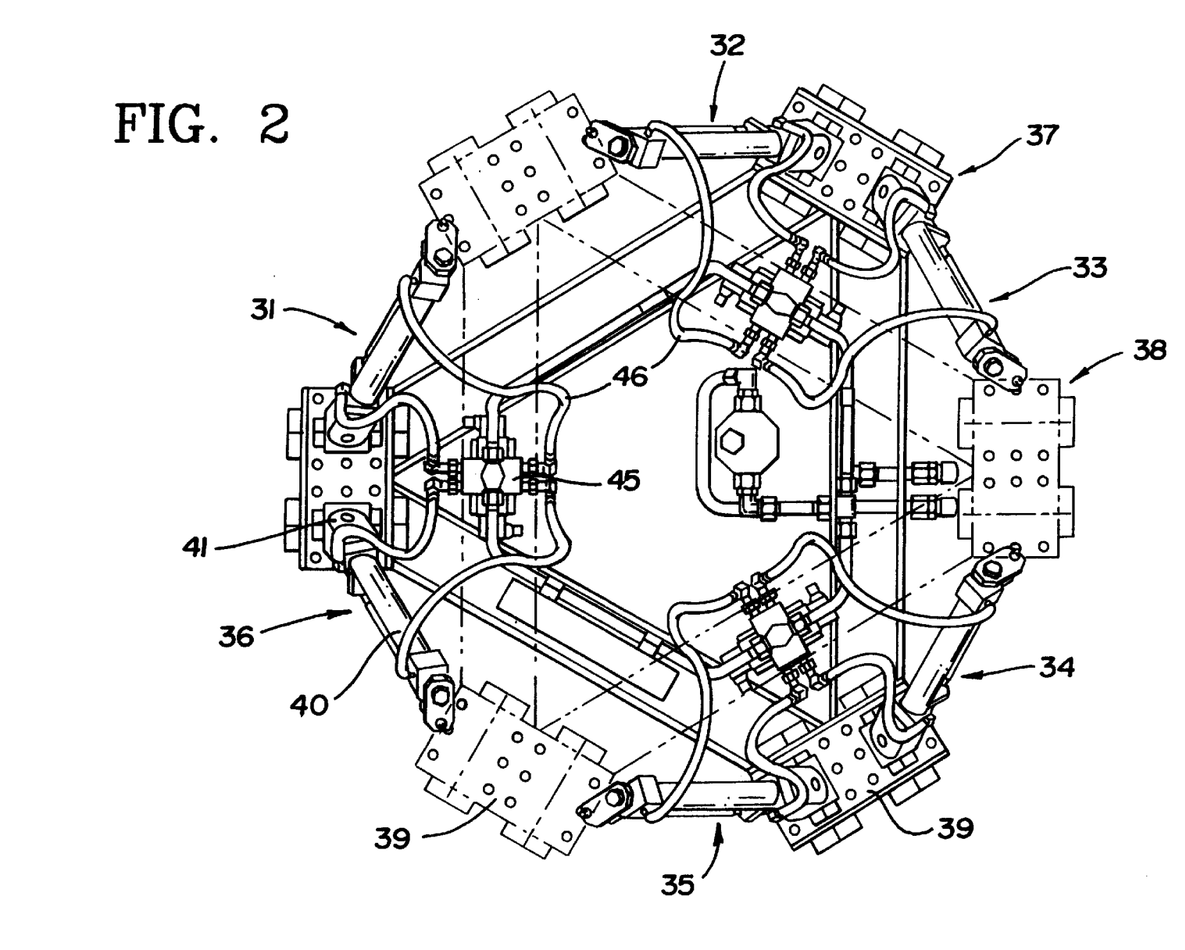
FIG. 2 shows a top view of the motion base assembly.

FIG. 2 shows a top view of the motion base 30 of FIG. 1. The motion base 30 includes six servo actuator legs 31–36 arranged in a symmetrical hexapod configuration, a lower, or base, platform 37 and an upper platform 38 upon which the capsule is mounted. As those skilled in the art will readily appreciate, the number of legs, and orientation of the legs, employed in the motion based may be varied without departing from the spirit of the present invention.

The actuators are interconnected by a conventional hydraulic system including accumulators 45 and various plumbing 46. While a hydraulic system is disclosed in accordance with the preferred embodiment, other actuating systems may be employed, for example, electric or pneumatic, without departing from the spirit of the present invention. Each servo actuator consists of an 18-inch stroke hydraulic cylinder 40, a servo valve, feedback transducers and two universal joints 41. The upper and lower platforms include three U-joint pads 39, each having two U-joints for connection to opposed actuators.

The composite height of the capsule and motion base is preferably less than 12–15 feet, which allows the unit 10 to be installed and operational in existing buildings with 12 to 15 foot ceilings. While specific dimensions are disclosed above, the dimensions may be varied to suit specific needs without departing from the spirit of the present invention. For example, those skilled in the art will readily appreciate the fact that the present apparatus may be used within buildings much larger than discussed above and the scale of the apparatus may be varied to suit specific needs.

Figure 3:
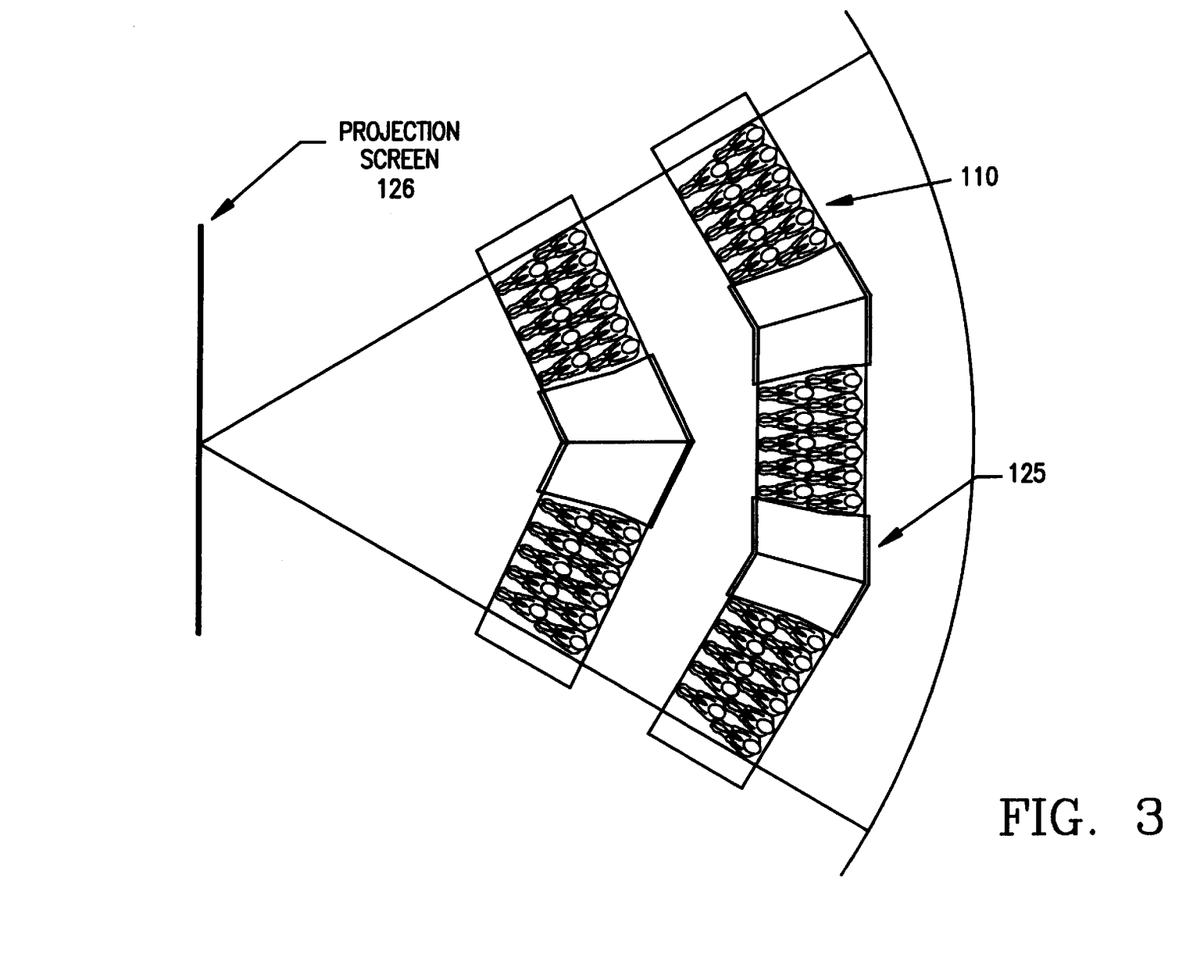
FIG. 3 shows a top view of a theater-type embodiment.
Figure 4:
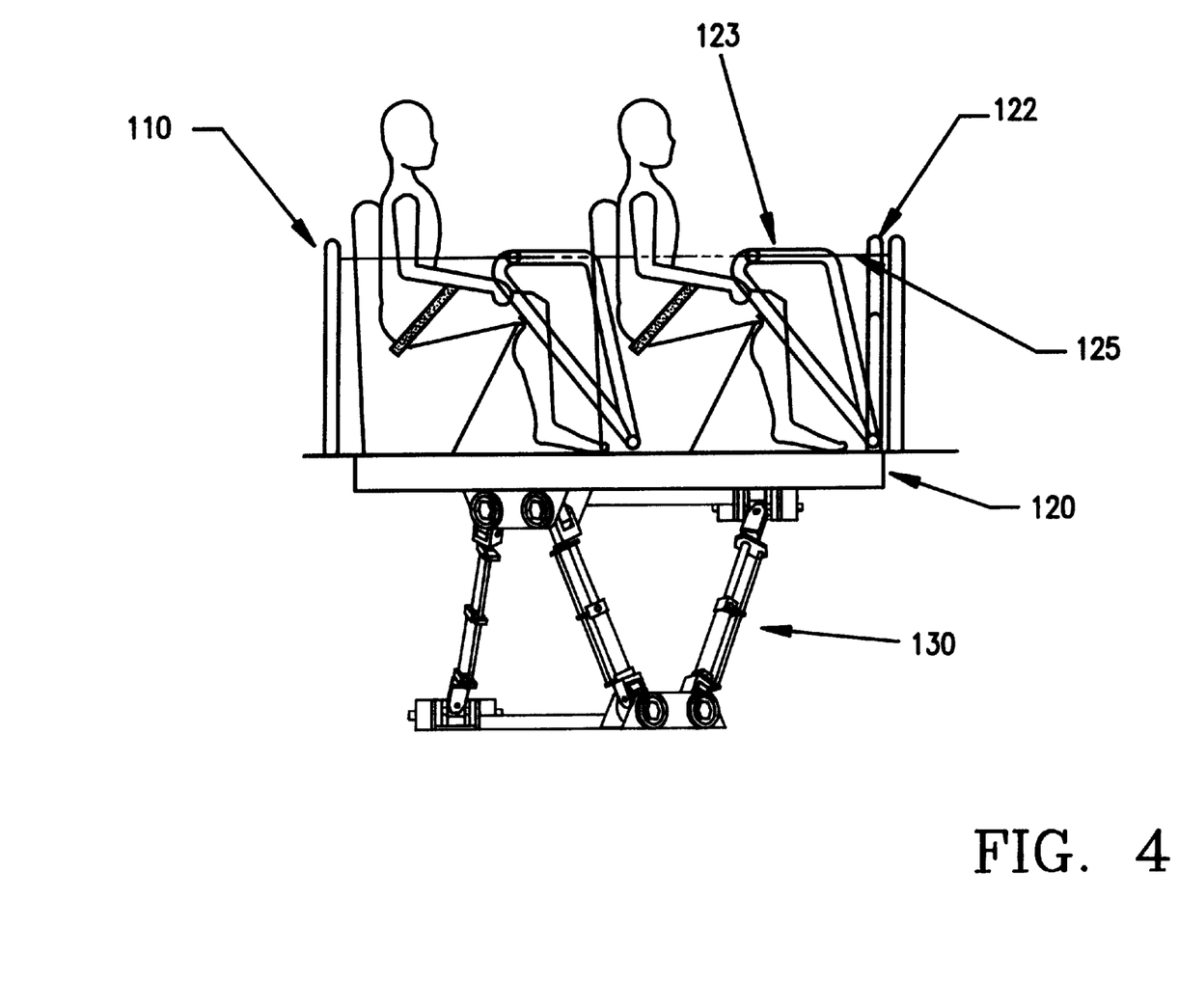
FIG. 4 shows a side view of a motion platform and base used in the embodiment disclosed in FIG. 3.

In a further embodiment, as shown in FIGS. 3 and 4, an open platform 120 is connected to a motion base 130. The platform may be designed to accommodate approximately 1–100 people. A plurality of units 110 are arranged in a theater environment where a central projection screen 126 is employed. Each unit 110 includes an access ramp 125 with hand railings located at each side of the seating platform 120. The ramps are lowered as in FIG. 3 to permit riders to load and unload from the platform and retracted as in FIG. 4 during operation of the amusement ride. In this embodiment, front and rear railings 122 and lap bars 123 are used for rider safety, however, in other embodiments, seat belts and/or lap bars could be employed. While specific ramp and railing locations are discussed above, those of ordinary skill in the art will readily appreciate that these features of the present simulator ride may be varied without departing from the spirit of the present invention.

The projection system of the present invention is unique in that 3-D video technology is combined with a moving motion base. The 3-D images are recorded on laser disc, or other video storage medium, which allows for precisely coded motion signals and rapid projector movement during viewing without losing picture quality.

In accordance with a preferred embodiment of the present invention, the simulator ride employs two video projectors 50, 55, stereoscopically related and synchronized together. The two projectors are usually positioned side by side (or stacked) such that both projected images converge as closely as possible on the screen. When the stereo pictures are reproduced on a common screen, each is projected with opposing polarized filtering, usually linear or circular polarization.

For example, images are projected with opposed polarization. The two pictures are superimposed on each other and the viewer uses special glasses with polarized filter lenses such that the left lens filters out the right video images and the right lens filters out the left video images. The resulting picture provides an excellent illusion of three-dimensional depth, and adds realism to the experience.

It should be understood that the opposing polarized filters are just one method of producing 3-D images, and the present invention contemplates using either linear or circular polarized filters, as well as numerous other techniques. Those skilled in the art will readily appreciate that a wide variety of techniques are known for accomplishing 3-D images, and the disclosed technique may be varied without departing from the spirit of the present invention.

Figure 8:
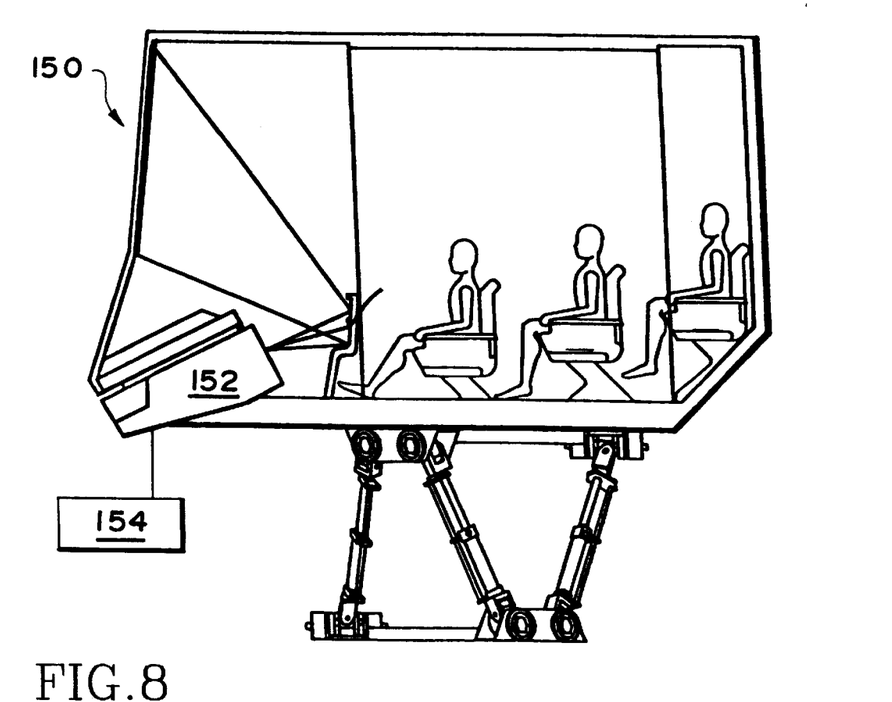
FIG. 8 shows a side view of an alternate embodiment of the present invention using a single projector.

While a dual projector system is disclosed in accordance with a preferred embodiment of the present invention, other 3-D projector systems, for example, a single projector system 150 as shown in FIG. 8, may be employed without departing from the spirit of the present invention. The single projector system is identical to the systems disclosed above but includes a single projector 152 and laser disc player 154 which alternate fields of the left and right images in providing the desired 3-D image. Similarly, 3-D imaging may also be accomplished using a conventional-type television.

Figure 5:
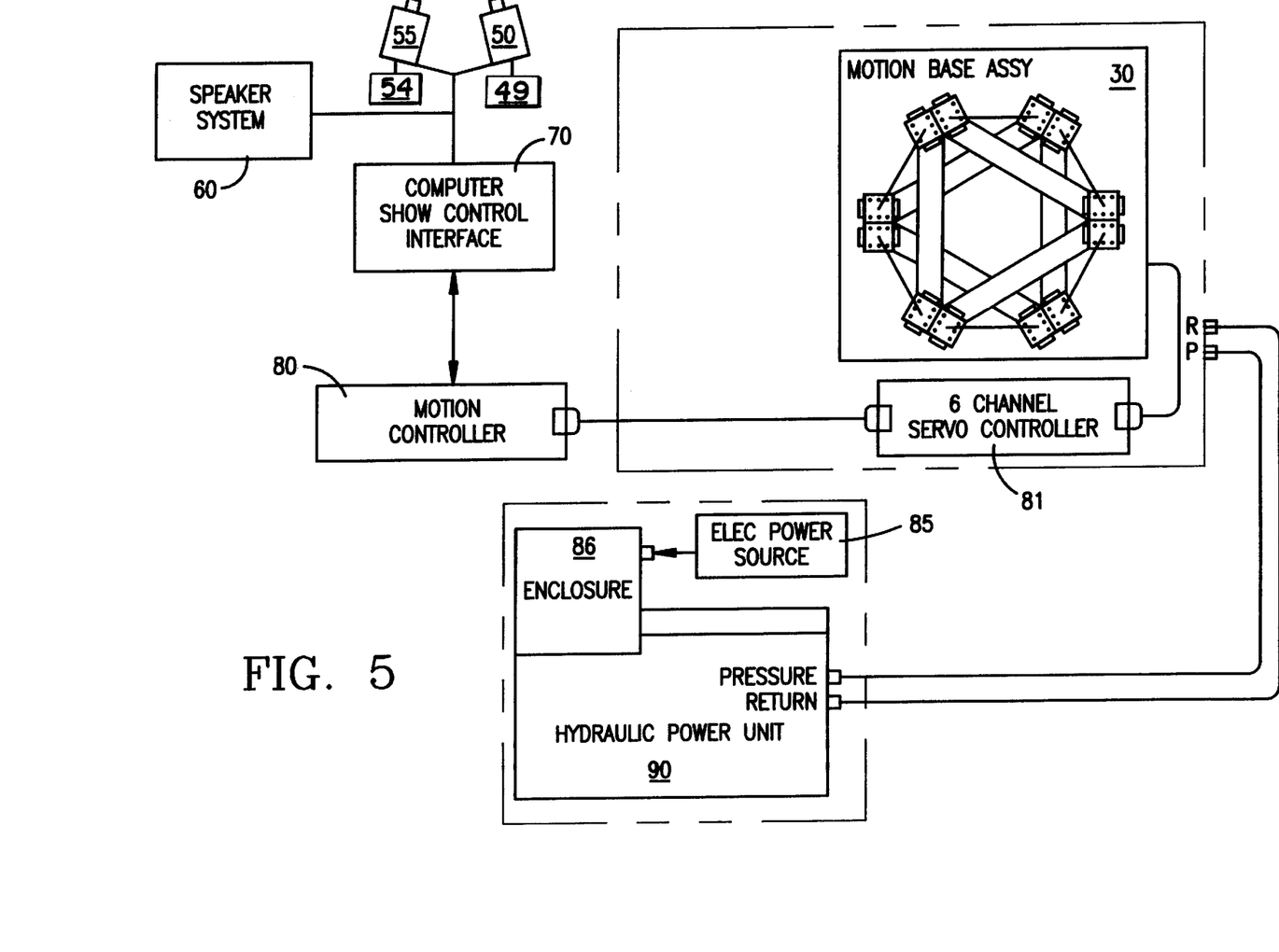
FIG. 5 shows a block diagram of the overall operational system.

The motion base 30 is powered by electricity coming into the system 85 and a hydraulic power unit 90 featuring a hydraulic fluid reservoir, a pump and an integrated motor starter enclosure 86. An output filter (not shown) assures cleanliness of the hydraulic fluid and a circulation type air-oil heat exchanger (not shown) cools the fluid. The motion controller 80 is electronic. The motion controller 80 operates six servo controllers 81, and logic, to start and stop the hydraulic power. While six servo controllers are disclosed in accordance with the preferred embodiment of the present invention, the number of controllers may be varied to suit specific design considerations without departing from the spirit of the present invention.

In operation, and with reference to FIG. 5, pre-recorded 3-D right and left eye laser discs are inserted into laser video disc players 49 and 54 respectively associated with the laser video projectors 50 and 55. The signals are then fed to the video projectors and the show control computer. The video projectors then project the recorded images on a common screen. The audio signals are sent to a speaker system 60 and time coded information is sent to show control computer interface 70. The show control computer 70 processes the time code information and controls the hydraulic system to actuate the actuators 31–36 to create motion in six degrees of freedom.

In practice, a motion controller 80 of the show control computer controls the hydraulic system to actuate the actuators 31–36 and create motion in six degrees of freedom. The motion created corresponds simultaneously to both the video images being displayed and the audio being heard. The riders view the projected video with glasses which allow 3-D viewing. While viewing, they also experience motion via the motion base, special effects of wind via fans and seat vibrations via vibrators. All of these effects are all controlled by the show control computer 70.

Figure 9:
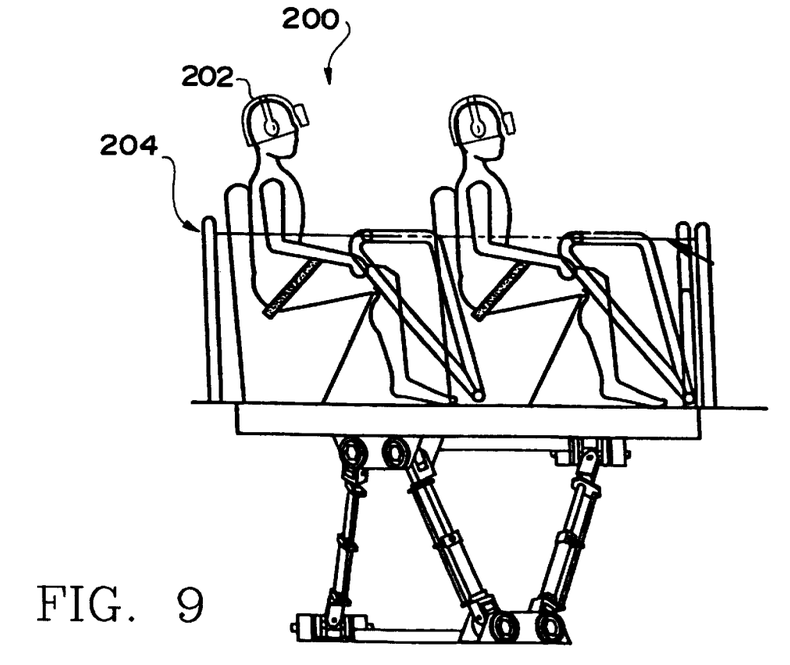
FIG. 9 shows a side view of a motion platform and base used in an alternate embodiment of the present invention.
Figure 10:
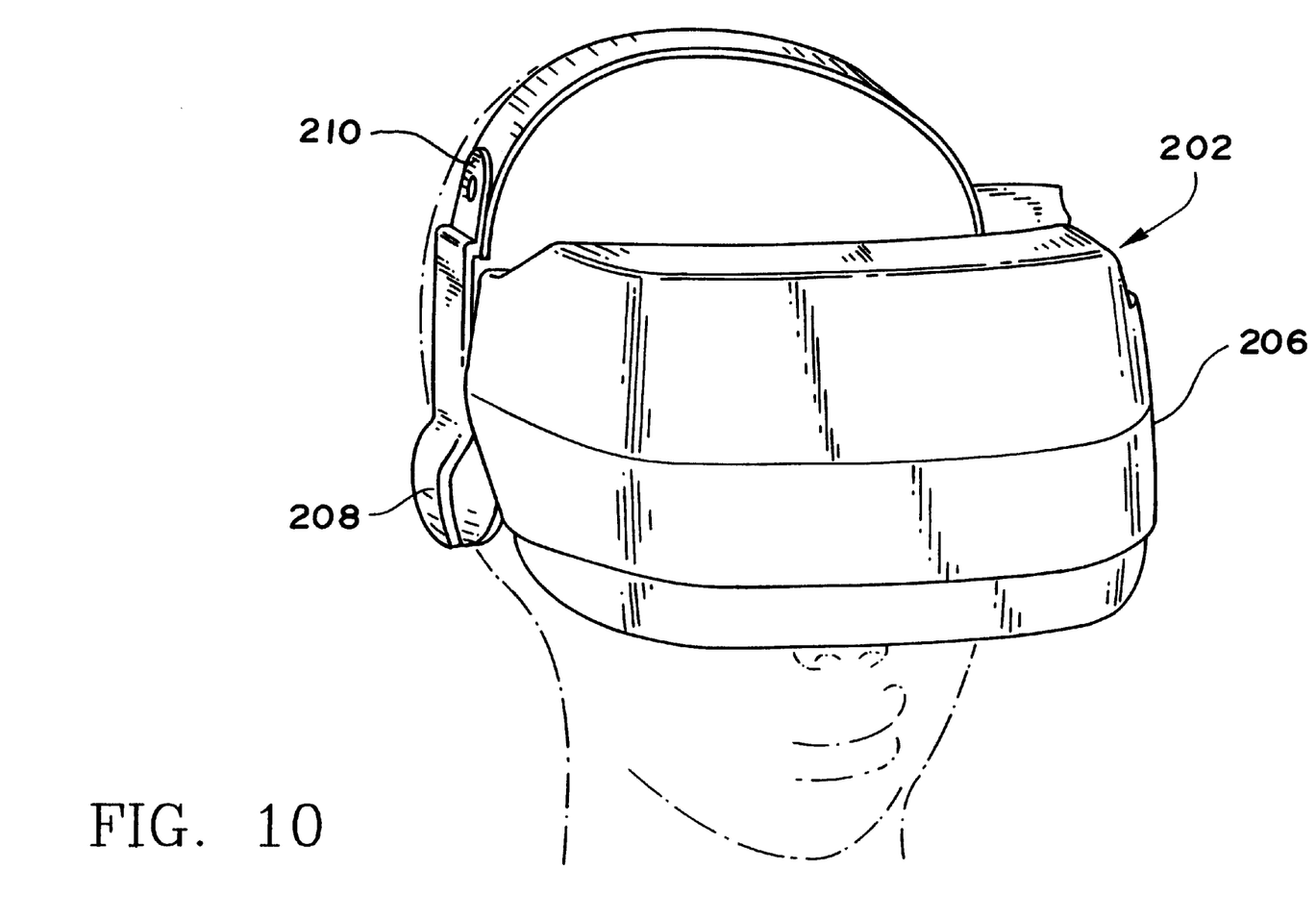
FIG. 10 shows a perspective view of a personal head mounted display used in accordance with the embodiment disclosed in FIG. 9.

With reference to FIGS. 9 and 10, an alternate embodiment 200 of the present invention is disclosed. The alternate embodiment employs a personal head mounted display 202 to project 3-D images to an individual seated within a motion platform 204. The personal head mounted display 202 includes a personal screen 206, loudspeakers 208 and a head mounting structure 210. For example, personal head mounted displays such as the CYBERMAXX may be used.

As to the motion base and the show control computer interface, they are substantially identical to those disclosed with reference to the embodiment disclosed in FIGS. 1–7. However, variations in their design and construction may be possible without departing from the spirit of the present invention.

While various preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. An amusement ride apparatus comprising:
    a motion base with a plurality of degrees of freedom of motion including a plurality of actuators supporting a platform;
    a passenger holding means secured to the platform and including a plurality of seats;
    a digital storage medium storing 3-D video information with corresponding motion control information;
    a 3-D personal head mounted video unit, wherein the 3-D personal head mounted video unit projects a 3-D image based upon 3-D video information stored on the digital storage medium; and
    a motion control system including a computer which receives digital motion control information encoded on the digital storage medium for moving the platform in correspondence with the 3-D video information and the 3-D image.

2. The amusement ride according to claim 1, wherein the passenger holding means includes a housing for enclosing the seats.

3. The amusement ride according to claim 2, wherein the motion base and the housing are dimensioned so as to allow the ride to be installed and fully operational in a building with 15 foot ceilings.

4. The amusement ride according to claim 1, wherein the digital storage medium is two laser video disc players.

\* \* \* \* \*